(12) United States Patent
Khotimsky et al.

(10) Patent No.: US 11,616,592 B2
(45) Date of Patent: Mar. 28, 2023

(54) DYNAMIC ASSIGNMENT OF BROADCAST ALLOCATION IDENTIFIERS

(71) Applicant: Verizon Patent and Licensing Inc., Basking Ridge, NJ (US)

(72) Inventors: Denis A. Khotimsky, Westborough, MA (US); Eugene DeFrancisci, Seaford, NY (US); Gregory K. Sherrill, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/091,527

(22) Filed: Nov. 6, 2020

(65) Prior Publication Data

US 2022/0149969 A1 May 12, 2022

(51) Int. Cl.
*H04J 14/00* (2006.01)
*H04J 14/02* (2006.01)
*H04B 10/27* (2013.01)

(52) U.S. Cl.
CPC ............ *H04J 14/023* (2013.01); *H04B 10/27* (2013.01)

(58) Field of Classification Search
CPC H04J 14/023; H04B 10/27; H04Q 2011/0086
See application file for complete search history.

(56) References Cited

U.S. PATENT DOCUMENTS

| | | | | |
|---|---|---|---|---|
| 2004/0052274 | A1* | 3/2004 | Wang | H04J 3/1694 370/468 |
| 2006/0275036 | A1* | 12/2006 | Hochbaum | H04J 14/0247 398/67 |
| 2016/0352451 | A1* | 12/2016 | Luo | H04B 10/27 |
| 2018/0241471 | A1* | 8/2018 | Khotimsky | H04B 10/27 |
| 2020/0344534 | A1* | 10/2020 | Luo | H04Q 11/0067 |

* cited by examiner

*Primary Examiner* — Pranesh K Barua

(57) ABSTRACT

A method may include determining a number of categories associated with optical network units (ONUs) in a system and assigning an allocation identifier to each of the respective categories. The method may also include transmitting the assigned allocation identifiers to the ONUs and transmitting a contention-based allocation to the ONUs, wherein the contention-based allocation includes a first one of the allocation identifiers.

20 Claims, 7 Drawing Sheets

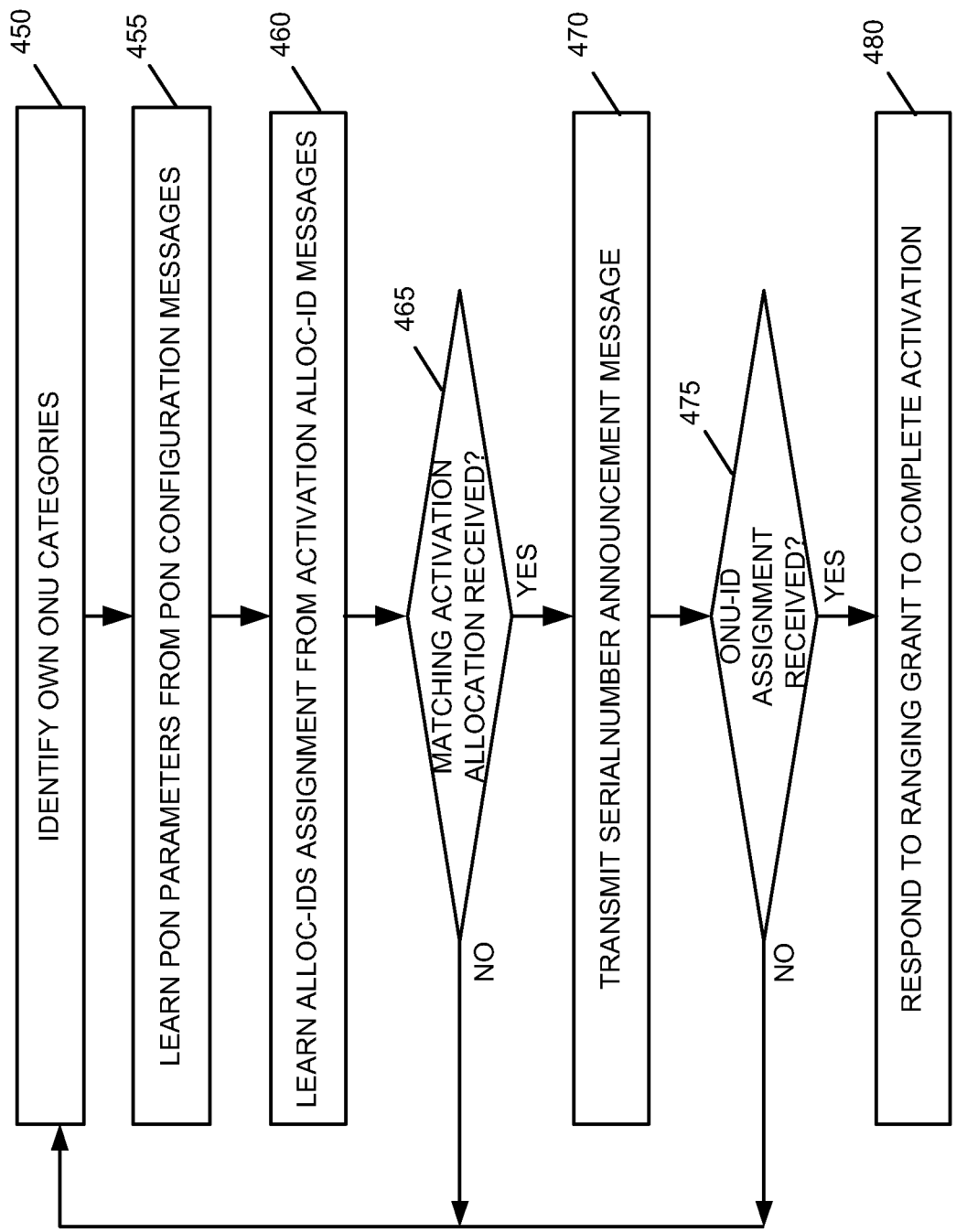

DYNAMIC ASSIGNMENT OF BROADCAST ALLOCATION IDENTIFIERS

BACKGROUND

A Passive Optical Network (PON) system is an optical access network that is typically based on a point-to-multipoint (P2MP) optical fiber topology, known as an optical distribution network (ODN). An ODN uses fiber and passive components, such as splitters and combiners. A PON system uses the ODN to provide connectivity between a number of central nodes and a number of user nodes using bi-directional wavelength channels. Operation of the PON system in the upstream direction from user nodes to the central nodes typically utilizes principles of Time-Division Multiple Access (TDMA) for each wavelength channel. For example, each user node is granted, or allocated an upstream transmission opportunity within a tightly controlled time interval.

In response to a grant of a transmission opportunity, also referred to as an allocation, a user node turns on its optical transmitter, transmits a burst of data along with Operations and Maintenance (O&M) information, and then turns off its transmitter until the next transmission opportunity is granted. The transmission opportunity can be granted to a specific individual node (a directed grant, or allocation) or to a group of nodes to perform a specific function, such as activation of an optical network unit (ONU) operating at a specific combination of upstream and downstream line rates (a contention-based grant, or allocation). The transmission opportunities are granted to the user nodes or groups of user nodes by the central node, for example, by use of a bandwidth map.

In a conventional PON system, the central node may grant consecutive allocations having a specific allocation identifier (referred to as an Alloc-ID). An Alloc-ID is a specific number assigned to one or more allocations granted to one specific user node or one specific function. In conventional PON systems, there are typically two classes of Alloc-IDs: dedicated Alloc-IDs which are assigned to an individual user node, and broadcast or contention-based Alloc-IDs, which are assigned to a specific contention-based function.

In a Gigabit-capable PON (GPON) system according to the G.984 series of International Telecommunication Union (ITU)-T Recommendations, particular Alloc-ID numbers are explicitly reserved. For example, Alloc-ID 254 is reserved for user node activation purposes. Similarly, in the next generation (NG)-PON2 system specified in the G.989 series of ITU-T Recommendations, Alloc-IDs 1021, 1022 and 1023 are reserved for activation of the user nodes operating at the maximum specified upstream line rate, or at the fractional upstream line rate, or both.

BRIEF DESCRIPTION OF THE DRAWINGS

FIGS. 4A and 4B are flow diagrams illustrating processing associated with ONU activation in the environment of FIG. 1 in accordance with an exemplary implementation;

DETAILED DESCRIPTION OF PREFERRED EMBODIMENTS

Figure 1:
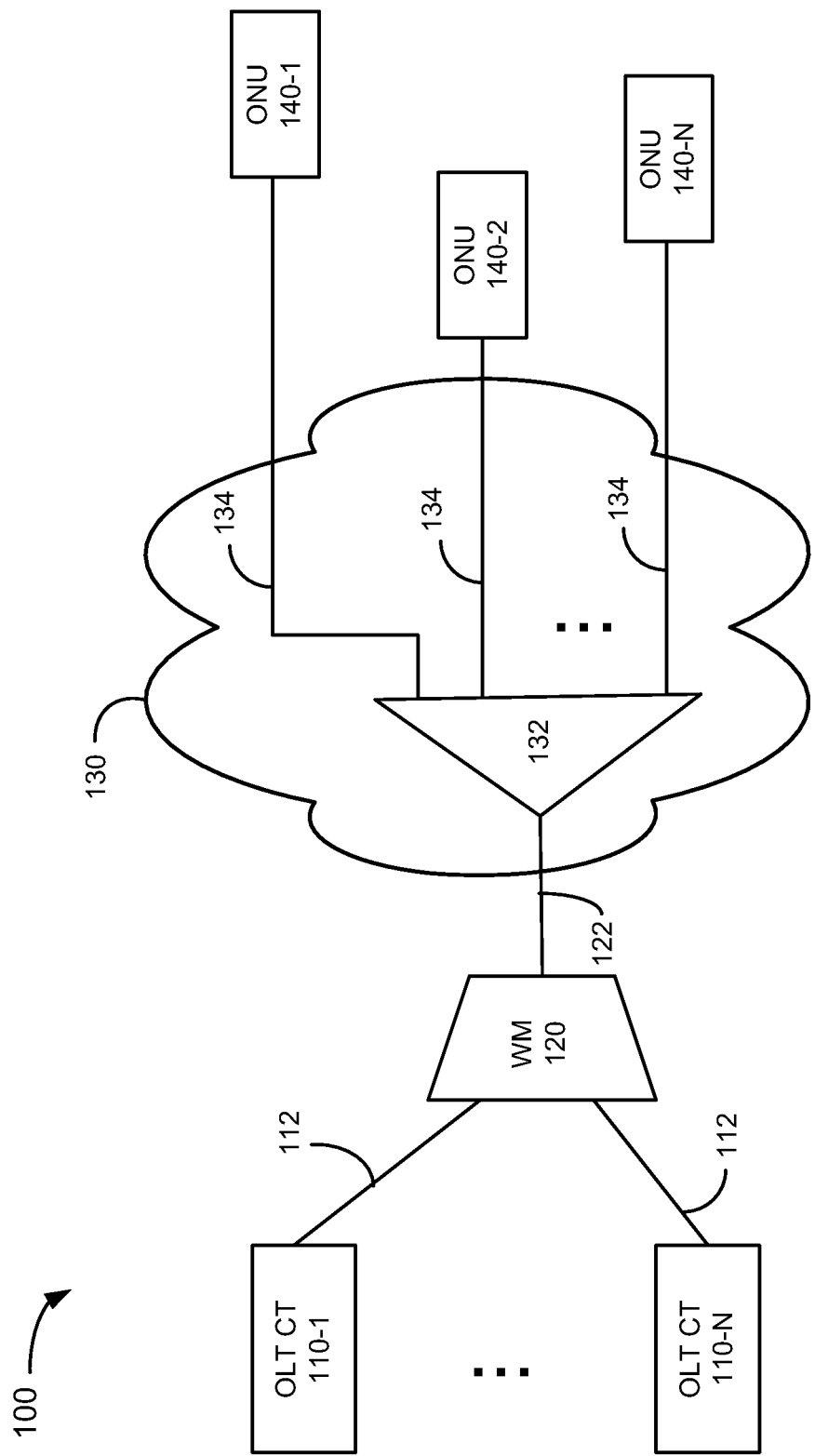
FIG. 1 illustrates an exemplary multi-channel PON system in which systems and methods described herein may be implemented.

The following detailed description refers to the accompanying drawings. The same reference numbers in different drawings may identify the same or similar elements.

As described above, in conventional PON systems, Alloc-IDs may be reserved for a number of functions, such as the activation of user nodes. Reserving Alloc-IDs in this manner may cause problems. For example, the use of reserved broadcast Alloc-IDs to allow multiple fractional rates and their arbitrary combinations may result in the reservations of excessive numbers of pre-assigned Alloc-IDs and an inefficient use of the Alloc-ID as a system number resource. In addition, such reservations of Alloc-IDs may unnecessarily complicate the configuring and deployment of user nodes (e.g., ONUs) and central nodes in an advanced PON system.

Implementations described herein provide systems and methods for performing ONU activation using a plurality of dynamically assigned contention-based Alloc-IDs. For example, a network operator may use a central node (e.g., an OLT CT) to assign one Alloc-ID for each known ONU category. The categories may be associated with a state of the ONU, such as whether the ONU is a new device joining the PON for the first time or whether the ONU is an existing device that is reconnecting to the PON after a reboot, power failure or other issue. The categories may also be associated with the line rates at which the ONUs operate. In contrast to conventional ONU activation processing that uses pre-assigned Alloc-IDs, Alloc-IDs may be dynamically assigned to allow a network operator to take into account the category of the ONUs used in the particular deployment and to adjust the set of assigned Alloc-IDs to the known categories of the deployed ONUs.

The network operator may also adapt the parameters of the transmission to the particular characteristics of each ONU category. For example, the network operator may use a broadcast operation, administration and management (OAM) message to communicate the assignment of Alloc-IDs to ONUs to grant upstream transmission opportunities for activation of individual categories of ONUs, while adjusting the information and overhead parameters of the upstream transmission to the specific needs of each ONU category Further, in contrast to conventional ONU activation processing, the upstream overhead associated with each dynamically assigned Alloc-ID may be optimized to the corresponding ONU categories. As a result, using dynamically assigned Alloc-IDs for ONU activation may increase the system throughput and improve the utilization of a system number resource, such as the utilization of Alloc-IDs. For example, dynamically assigning Alloc-IDs for ONU categories may provide efficient use of Alloc-IDs as a system number resource, achieve flexibility in accommodating various categories of user nodes and increase upstream throughput by minimizing the burst-mode overhead associated with ONU activation. In addition, implementations described herein may also effectively perform collision resolution in situations in which multiple activating ONU transmissions collide.

FIG. 1 illustrates an exemplary PON environment 100 in which systems and methods described herein may be implemented. PON environment 100 includes a multi-channel time wavelength division multiplexing (TWDM) system that includes a number of optical line terminal channel termination (OLT CT) devices 110-1 through 110-N, wavelength multiplexer (WM) 120, optical distribution network (ODN) 130 and optical network units (ONUs) 140-1 through 140-N (referred to individually as ONU 140 or ONU 140-x, and collectively as ONUs 140, and also referred to as optical user nodes 140).

OLT CT devices 110 (referred to individually as OLT CT 110 or OLT CT 110-x, and collectively as OLT CTs 110) each include an optical device that may perform various functions, such as traffic scheduling, buffer control and bandwidth allocation. In an exemplary implementation, each OLT CT 110 is associated with its own bi-directional wavelength channel having a fixed downstream wavelength and a fixed upstream wavelength. OLTs 110 may be connected to WM 120 via channel attachment fibers 112. In an exemplary implementation, OLT CT 110 controls upstream transmissions from ONUs 140 via a Bandwidth Map (BWmap). For example, OLT CT 110 may generate the BWmap based on a number of inputs and transmit the BWmap via WM 120 and PON 130 to ONUs 140.

ODN 130 includes an optical network that provides an optical transmission medium between, for example, OLT CTs 110 and ONUs 140. For example, ODN 130 may include trunk fiber 122, optical splitter 132 and optical drop fibers 134. ODN 130 may also include fiber optic connectors, attenuators, modulators and other optical components (not shown). In an exemplary implementation, ODN 130 may include a passive optical distribution network that includes no active components that are used to transmit signals through ODN 130. In other implementations, ODN 140 may include active optical network components, such as optical amplifiers, reach extenders, etc.

ONUs 140 (referred to individually as ONU 140 or ONU 140-x, or collectively as ONUs 140) may each include an optical device that provides network-side line termination. It may also include optical, electric, or wireless devices that provide user-side interfaces. For example, ONU 140 may perform various functions, such as converting an optical signal to an electrical signal and multiplexing and de-multiplexing. ONU 140 may connect to various end devices or user devices (not shown). The end devices may execute applications and provide users with access to various services, such as television service, telephone service, Internet service and/or other types of services.

In accordance with an exemplary implementation, each ONU 140 may choose a single wavelength channel via which to operate and a single OLT CT 110 as a central node with which ONU 140 will communicate and receive instructions. ONU 140 may also switch wavelength channels, as instructed by the respective OLT CT 110. In addition, and in accordance with an exemplary implementation, an optical transmitter at OLT CT 110 operates in a continuous wave (CW) mode and an optical transmitter at ONUs 140 operates in a burst mode (BM).

The exemplary configuration illustrated in FIG. 1 is provided for clarity. It should be understood that a typical environment may include more or fewer devices than illustrated in FIG. 1. For example, PON environment 100 may include a large number (e.g., hundreds or more) of ONUs 140, as well as a large number of OLT CTs 110. PON environment 100 (e.g., ODN 130) may include additional splitters and network devices that aid in routing data in environment 100.

Various operations are described below as being performed by particular components in PON environment 100. In other implementations, various operations described as being performed by one device may be performed by another device or multiple other devices, and/or various operations described as being performed by multiple devices may be combined and performed by a single device.

In order for an ONU 140-x to operate or resume operations in PON environment 100, OLT CT 110-x associated with the wavelength channel in which ONU 140-x operates, ONU 140-x must execute a specific set of distributed procedures, such as a set of distributed procedures known as ONU activation. The ONU activation may include several phases, for example, parameter learning, serial number acquisition (also known as ONU discovery), and ranging. In accordance with an exemplary implementation, the ONU activation may also include Alloc-ID assignment, as described in detail below.

Figure 2:
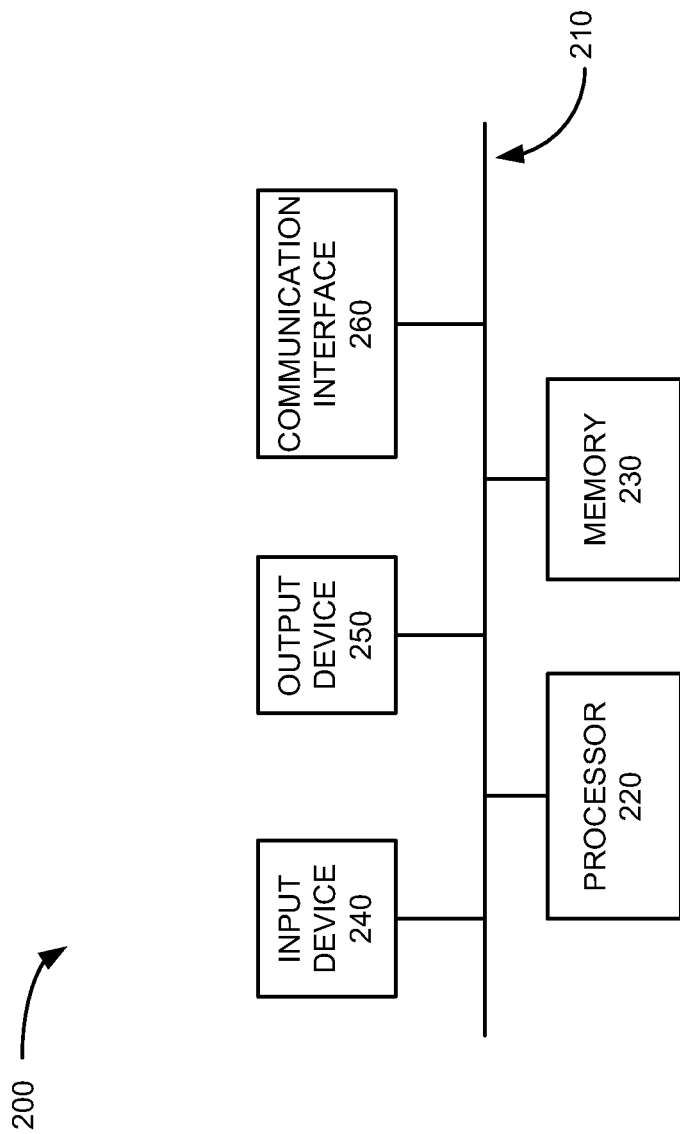
FIG. 2 is a block diagram of components implemented in one or more of the elements illustrated in FIG. 1 in accordance with an exemplary implementation.

FIG. 2 illustrates an exemplary configuration of a device 200. Device 200 may correspond to or include elements implemented in components of PON environment 100, such as OLT CTs 110, a component of OLT CT 110 (e.g., an ONU activation module/logic, a bandwidth map generation module/logic, etc.), ONUs 140, etc. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more optical or radio frequency (RF) transmitters, receivers and/or transceivers and one or more components and/or antennas for transmitting and receiving optical data, RF data, etc. Communication interface 460 may also include a modem or an Ethernet interface to a LAN or other mechanisms for communicating with elements in a network.

The exemplary configuration illustrated in FIG. 2 is provided for simplicity. It should be understood that device 200 may include more or fewer devices than illustrated in FIG. 4. In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD), etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
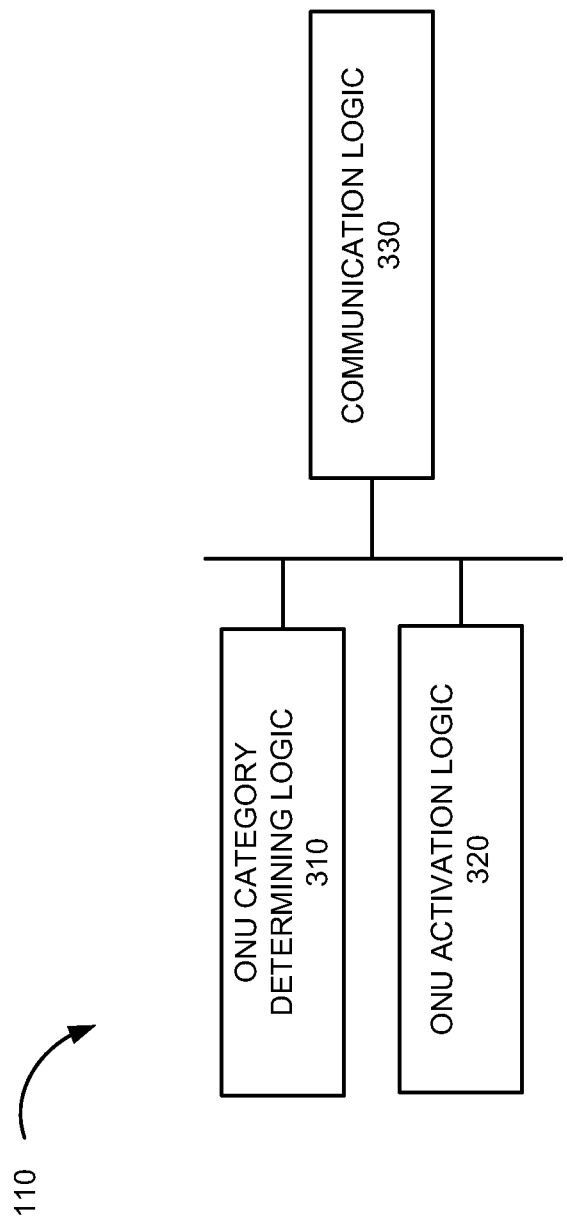
FIG. 3 is a block diagram of components implemented in the optical line terminal channel termination (OLT CT) device of FIG. 1 in accordance with an exemplary implementation.

FIG. 3 is a block diagram of components implemented in OLT CT 110 in accordance with an exemplary implementation. Referring to FIG. 3, OLT CT 110 includes ONU category determining logic 310, ONU activation logic 320 and communication logic 330. These elements may be implemented by processor 220 executing instructions stored in memory 230 of OLT CT 110. In alternative implementations, these components or a portion of these components may be located externally with respect to OLT CT 110.

ONU category determining logic 310 may include logic associated with determining categories of ONUs 140 operating in environment 100. For example, ONU category determining logic 310 may identify categories of ONUs, such as categories based on the state of operation of ONUs. For example, ONU category determining logic 310 may identify the state of an ONU 140 as "warm," "cold," or another state. In an exemplary implementation, warm ONUs 140 may correspond to ONUs 140 that have previously connected with OLT CT 110 and may need to reconnect to OLT CT 110 based on a power outage, a reboot, or some other issue. Cold ONUs 140 may correspond to ONUs 140 that are new devices being added to environment 100 and have not previously connected to OLT CT 110. ONU category determining logic 310 may also identify categories of ONUs 140 based on the line rates at which the ONUs 140 transmit data and other factors/characteristics of ONUs 140.

ONU activation logic 320 may include logic associated with activating ONUs 140 in environment 100. For example, ONU activation logic 320 may include logic associated with a parameter learning phase, an ONU acquisition or discovery phase and a ranging phase in environment 100. In accordance with an exemplary implementation, ONU activation logic 320 may also include logic association with dynamically assigning Alloc-IDs based on the particular ONU category, as described in detail below. For example, ONU activation logic 320 may generate OAM messages which include the category information which will be broadcast to ONUs 140. An ONU 140 may then determine whether its particular category matches the category in the OAM message, as described in detail below.

Communication logic 330 may include logic for communicating with devices in environment 100. For example, communication logic 330 may include an optical transceiver that transmits and receives optical information to/from PON 130. Communication logic 330 may communicate with WM 120 and other devices in environment 100. In an exemplary implementation, communication logic 330 may transmit messages generated by ONU activation logic 320, as described in detail below.

Although FIG. 3 shows exemplary components of OLT CT 110, in other implementations, OLT CT 110 may include fewer components, different components, differently arranged components, or additional components than depicted in FIG. 3.

Figure 4A:
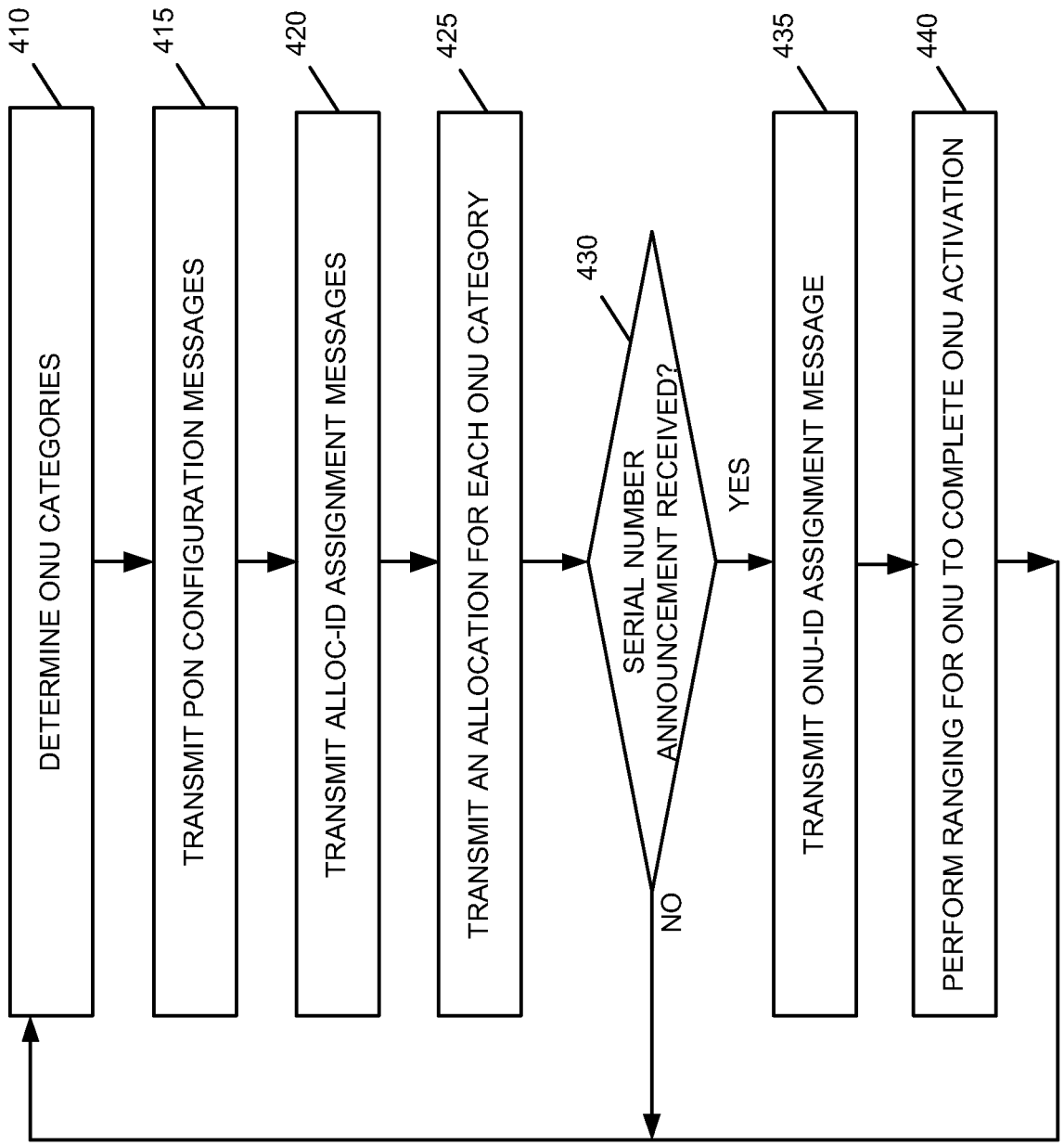

FIG. 4A is a flow diagram illustrating processing associated with ONU activation from the perspective of OLT CT 110 and FIG. 4B is a flow diagram illustrating processing associated with ONU activation from the perspective of an ONU 140 in accordance with an exemplary implementation. FIGS. 4A and 4B will be described below in connection with FIG. 5, which is an exemplary signal flow diagram associated with ONU activation in environment 100. To support ONU activation, OLT CT 110 may determine the set of categories associated with ONUs 140 in environment 100 (block 410). This determination may occur based on the advanced knowledge about the types of ONUs 140 used in PON environment 100, based on the information obtained in the course of prior activations of ONUs 140, based on information provided by network personnel associated with environment 100, etc. For example, as described previously, ONU category determining logic 310 may categorize ONUs 140 based on the state of operation (e.g., cold, warm, etc.), based on a fixed capability (e.g., a maximum upstream line rate, a fractional value of the maximum upstream line rate, a combination of line rates that includes the maximum upstream line and all possible fractional values of the maximum line rate, etc.), other factors and/or characteristics of ONUs 140 and/or environment 100.

For example, OLT CT 110 may identify a category for ONUs 140 that support a particular combination of upstream line rates. As another example, OLT CT 110 may categorize ONUs 140 based on the fixed design capability. For example, different types of ONUs 140 may, by design, require different preamble sizes of the burst carrying upstream OAM messages (e.g., messages 550 described below). In such cases, OLT CT 110 may identify a category for ONUs 140 (and dynamically assign different allocation identifiers for activating such ONUs 140) that require particular preamble sizes and include the description of the required preamble as a field or subfield of an OAM message (e.g., a subfield of an applicable ONU category field 640 described below). In still other implementations, ONUs 140 may be categorized based on an element of a static configuration associated with ONUs 140. For example, ONUs 140 may be categorized based on a specific upstream line rate selected via, for example, a hardware switch or software option from a set of upstream line rates and rate combinations that are available to ONUs 140.

As another example, for an ONU 140 categorization based on a component of a dynamic ONU 140 state (e.g., cold state, warm state, etc.), ONU 140-*x* may undergo a cold activation as a result of replacement of equipment at OLT CT 110, a power outage, or intentional user operation. Alternatively, ONU 140-*x* may undergo a warm reactivation as a result of a state machine transition caused by the internal logic or a command received from OLT CT 110. The cold and warm activation processes may require different preamble lengths in the command messages to perform receiver adjustment to the parameters of ONU 140-*x*'s optical signal. Accordingly, to distinguish between cold and warm activation, OLT CT 110 may dynamically assign different allocation identifiers for cold and warm activation of ONUs 140 and include the description of the required burst parameters as a field or sub-field of an application ONU category field (e.g., field 640 described below). In each case, the particular categories of ONUs 140 may be dynamically determined by OLT CT 110 while operating in PON environment 100 and stored in OLT CT 110. In other implementations, the categories may be stored in OLT CT 110 by a network operator associated with operating PON environment 100.

Figure 5:
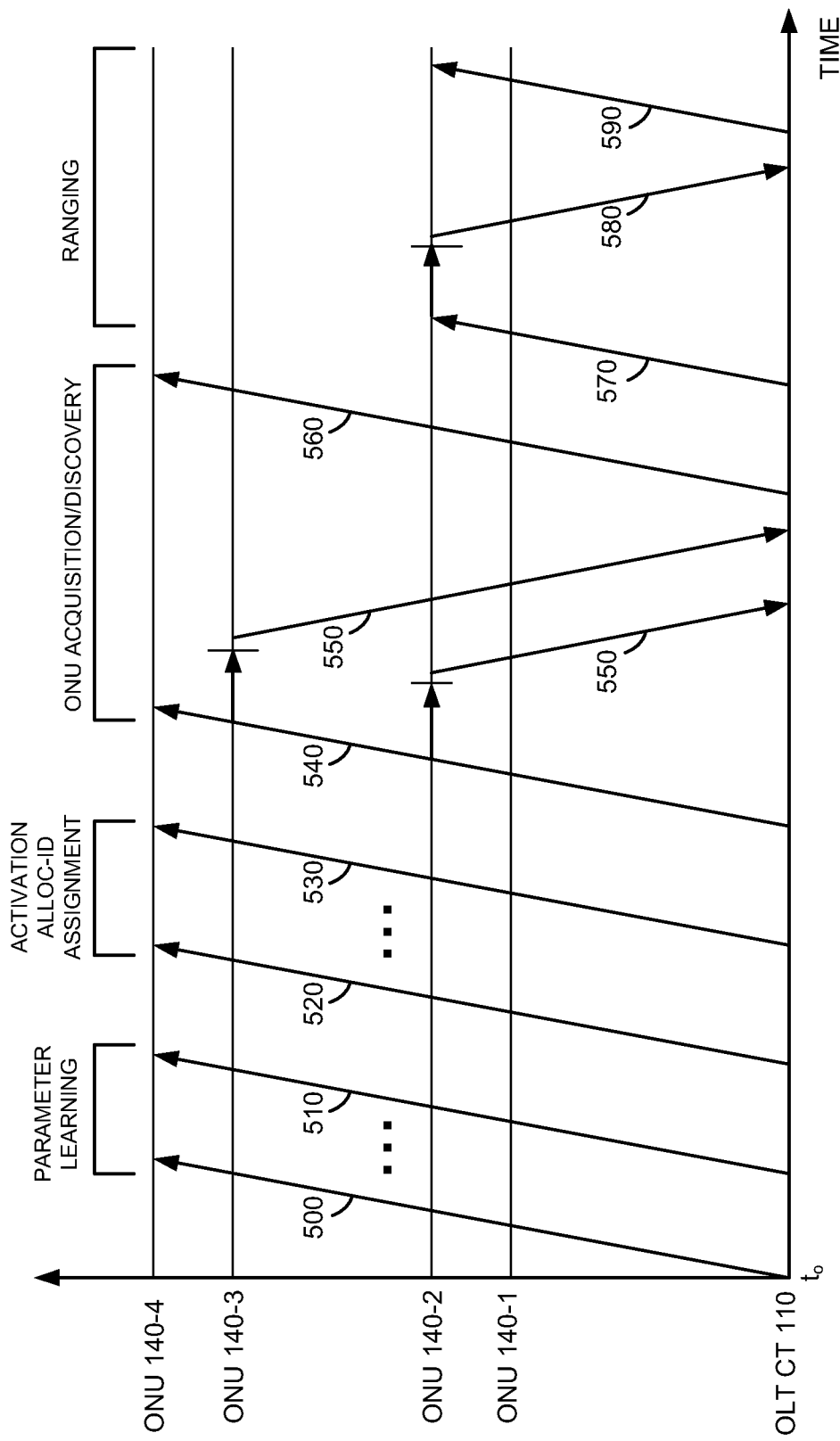
FIG. 5 is a message flow diagram associated with the processing of FIGS. 4A and 4B in accordance with an exemplary implementation.

As described previously, ONUs 140 must be activated to allow for operating in environment 100. To support the ONU 140 activation, OLT CT 110 may periodically transmit a series of one or more broadcast OAM messages, labeled 500 to 510 in FIG. 5, to ONUs 140 (block 415). Although only two messages 500 and 510 are shown in FIG. 5 for simplicity, it should be understood that OLT CT 110 may broadcast additional OAM messages. Messages 500-510 may be associated with the parameter learning phase of ONU activation and include information identifying the configuration of PON environment 100. For example, broadcast OAM messages 500-510 may include an Upstream Overhead message, a System Profile message, a Channel Profile message, a Burst Profile message, or other messages that identify configuration related parameters regarding the operation of ONUs 140 in environment 100. ONUs 140 receive and process the configuration messages to identify the parameters associated with operating in PON environment 100. That is, the information in OAM messages 500-510 allows ONUs 140 to later transmit information in accordance with the requirements associated with PON environment 100.

In accordance with an exemplary implementation, along with PON configuration parameter messages 500-510, OLT CT 110 may periodically transmit a series of one or more broadcast OAM messages 520-530 to ONUs 140 that support the activation Alloc-ID assignment phase of ONUs 140 activation (block 420). Although only two broadcast messages 520 and 530 are shown in FIG. 5 for simplicity, it should be understood that OLT CT 110 may broadcast additional messages. It should be further understood that FIG. 5 shows only one specific transmission order of OAM messages 500-530. In other implementations, PON configuration parameter broadcast OAM messages 500-510 and activation Alloc-ID assignment broadcast OAM messages 520-530 may be transmitted in any order with respect to each other. In each case, OLT CT 110 periodically transmits messages 500-530. Each of OAM messages 520-530 may assign a specific Alloc-ID for activation of ONUs 140 corresponding to a specific category. For example, as discussed above, ONUs 140 may be categorized by a fixed capability, such as the combination of the supported upstream line rates at which ONUs 140 transmit data, categorized based on a static configuration of ONUs 140, categorized based on the state of the particular ONUs 140 (e.g., cold, warm, etc.) and/or categorized based on other factors or characteristics of ONUs 140 that may be present in environment 100.

Figure 6:
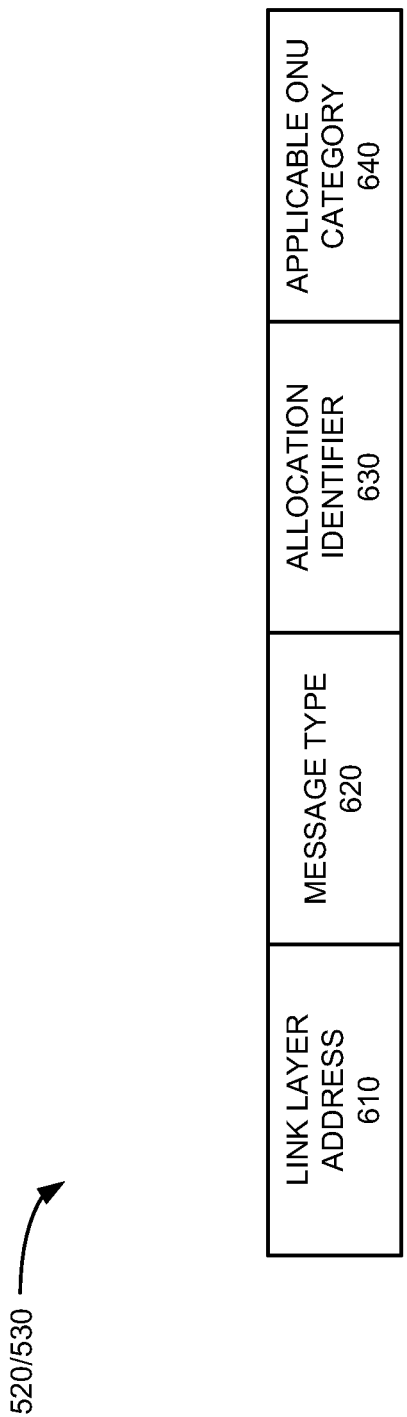
FIG. 6 illustrates the format of a message used in the dynamic assignment of activation allocation identifiers in accordance with an exemplary implementation.

FIG. 6 illustrates an exemplary format of broadcast OAM messages 520-530 according to an exemplary implementation. Referring to FIG. 6, each of OAM messages 520-530 includes link layer address field 610, message type field 620, allocation identifier field 630 and ONU category field 640. Link layer address field 610 indicates the ONU 140 which is the intended recipient of the message. For example, link layer address field 610 may include a value corresponding to a broadcast message indicating that the message is to be broadcast and received by all ONUs 140 in PON environment 100. Message type field 620 indicates the type of the downstream OAM message, such as a type associated with the dynamic assignment of activation Alloc-IDs. Allocation identifier field 630 indicates a specific value of an Alloc-ID, which is assigned for activation of a specific category of ONUs 140, such as ONUs 140 supporting a particular transmission rate, ONUs 140 in a cold state, ONUs 140 in a warm state, etc. Applicable ONU category field 640 identifies the specific category of ONUs 140 to which the assigned Alloc-ID applies. For example, the applicable ONU category field 640 uniquely identifies one of the categories described above (e.g., particular line rate, warm activation, cold activation, etc.).

The format of the dynamic Alloc-ID assignment OAM messages 520-530 shown in FIG. 6 is exemplary. It should be understood that in other implementation, other fields or arrangement of fields may be included in messages 520-530. In addition, in other implementations, some fields may be partitioned into multiple sections/sub-fields. For example, message type field 620 may include multiple sections, one section indicating the message type of Alloc-ID assignment, a second section indicating the type of assigned Alloc-ID (e.g., the contention-based Alloc-ID), and a third section indicating the contention-based function for which the Alloc-ID is assigned (e.g., ONU activation). Further, in some implementations, messages 520-530 may include additional fields. For example, messages 520-530 may include a field providing reference to a non-default collision resolution protocol to be used by the ONU 140-$x$ in case when the initial transmission of an allocation with an assigned Alloc-ID does not result in the link layer address assignment message 560 due to collision with a transmission by another ONU 140. In another example, messages 520-530 may include a field containing the configurable parameters of the collision resolution protocol, a message integrity verification field, and other fields. However, in each implementation, messages 520-530 provide information associated with dynamically assigning a contention-based Alloc-ID for a particular category of ONUs 140 to be activated in PON environment 100.

To support the ONU serial number acquisition phase of the ONU activation process, OLT CT 110 may broadcast a contention-based allocation 540 for each determined ONU category (block 425). Each allocation 540 may include a dynamically assigned Alloc-ID. In an exemplary implementation, allocation 540 may be in the form of a specific allocation structure of a Bandwidth Map (BWmap) that OLT CT 110-$x$ transmits downstream and that controls upstream transmissions from ONUs 140. Alternatively, allocation 540 may be in the form of an OAM message of a bandwidth allocation type.

After transmission of allocations 540, OLT CT 110 may determine if a serial number announcement from one or more ONUs 140 have been received (block 430). For example, upon successful receipt of an allocation 540, ONU 140-$x$ may transmit an upstream OAM message 550 identified by its serial number. If a serial number announcement is received (block 430—yes), OLT CT 110 assigns a link layer address to ONU 140-$x$ and communicates the assignment using a broadcast OAM message 560 (block 435). The link layer address may be in the form of an ONU-ID and broadcast OAM messages 560 may be an Assign ONU-ID message. If a serial number announcement is not received (block 430—no), OLT CT 110 may continue to periodically determine ONU categories and periodically transmit messages 500-530 and allocations 540.

Upon receipt of broadcast OAM message 560, which includes a serial number of ONU 140-$x$, the ONU acquisition and discovery phase of the ONU activation is completed. After completion of the ONU acquisition/discovery phase, a ranging phase of the ONU activation process may commence.

For example, since ONUs 140 in environment 100 are located at different distances from OLT CT 110, OLT CT 110 may measure the transmission delay associated with each ONU 140 and determine an equalization delay parameter for each ONU 140 to attempt to avoid collisions between transmitting ONUs 140. To perform ranging, OLT CT 110 may transmits a directed allocation 570 to ONT 140-*x* (e.g., ONU 140-2 in FIG. 5) and prepares to accurately measure the response time (block 440). In response to directed allocation 570, ONU 140-*x* transmits an upstream burst containing OAM message 580. OAM message 580 may be, for example, a Serial Number ONU message, a Registration message, or some other message. Based on the measured response time and/or a difference between the measured response time and the expected ideal response time, OLT 110 computes the equalization delay of ONU 140-*x* and communicates the computed equalization delay to ONU 140-*x* using unicast OAM message 590 addressed specifically to ONU 140-*x* (e.g., ONU 140-2 in FIG. 5). Unicast OAM message 590 may be, for example, a Ranging Time message. ONU 140-*x* acknowledges receipt of unicast OAM message 590. The receipt of unicast OAM message 590 completes the ranging phase of ONU 140-*x* activation and ONU activation is completed (block 440). At this point, ONU 140-*x* is considered activated. That is, ONU 140-*x* may be able to respond to allocations and transmit data to and receive data from OLT CT 110.

As described above, OLT CT 110 performs processes associated with ONU activation. ONUs 140, in response, also perform processes associated with the ONU activations. For example, ONUs 140 may identify its own particular category (FIG. 4B, block 450). Similar to OLT CT 110, ONU 140 may identify its category(ies) based on the state of operation (e.g., cold, warm, etc.), based on a fixed capability (e.g., a maximum upstream line rate, a fractional value of the maximum upstream line rate, a combination of line rates that includes the maximum upstream line and all possible fractional values of the maximum line rate, etc.), based on a static configuration of ONU 140, such as a specific upstream line rate selected via a hardware switch or software option from a set of upstream line rates and line rate combination, or other factors and/or characteristics of ONUs 140 and/or environment 100.

During the learning phase of ONU activation, ONUs 140 may receive messages 500-510 that include information identifying the configuration of PON environment 100. ONUs 140 receive and process the configuration messages to identify the parameters associated with operating in PON environment 100 (block 455). That is, the information in OAM messages 500-510 allows ONUs 140 to later transmit information in accordance with the requirements associated with PON environment 100.

ONUs 140 may also learn Alloc-IDs used in environment 100 based on messages 520-530 transmitted by OLT CT 110 (block 460). That is, ONUs 140 identify Alloc-IDs used in environment 100 and determine which Alloc-IDs will be associated with particular categories of ONUs 140. That is, ONU 140-*x* may determine if one or more of the Alloc-ID assignment messages 520-530 include category information in field 640 that matches its particular category.

After receiving a broadcast message 520-530 including category information that matches its particular category, ONU 140-*x* may enter an ONU serial number acquisition phase, or ONU discovery phase. However, in accordance with an exemplary implementation, during the ONU acquisition/discovery phase, ONU 140-*x* may continue to process broadcast OAM message 520-530 that are subsequently received since ONU 140-*x* may be associated with more than one category. As a result, more than a single OAM message 520-530 may match ONU 140-*x*'s current category or state of operation.

ONUs 140 receive allocations 540 and determine whether the broadcast contention-based allocation 540 includes a dynamically assigned Alloc-ID that matches a category of ONU 140-*x* (block 465). If the Allocation-ID matches a category of ONU 140-*x* (block 465—yes), ONU 140-*x* transmits an upstream burst containing OAM message 550 to announce its presence in environment 100 (block 470) (e.g., bursts 550 from ONU 140-2 and 140-3 in FIG. 5). If allocation 540 does not include category information in field 640 that matches the category associated with ONU 140-*x* (block 465—no), ONU 140-*x* may continue to periodically receive messages 510-530 and allocations 540 and determine if the category included in any of allocations 540 matches a category associated with ONU 140-*x*.

In an exemplary implementation, the parameters of the burst OAM message 550 transmitted by ONU 140-*x* are not limited to the those specifically referenced by the allocation 540 from the pool of parameters that ONU 140-*x* has obtained from downstream broadcast configuration messages 500-510. For example, burst messages 550 may include information that ONU 140-*x* has received via broadcast OAM messages 520-530, which assigned the dynamic Alloc-ID to which allocation 540 has been granted.

In each case, the upstream OAM messages 550 may include information uniquely identifying ONU 140-*x*. For example, OAM message 550 may be a Serial Number ONU message that includes a serial number or other information uniquely identifying ONU 140-*x*.

ONU 140-*x* may then determine if a broadcast OAM message 560, which includes a serial number of ONU 140-*x*, is received (block 475). If ONU 140-*x* receives the ONU-ID assignment (block 475—yes), the ONU acquisition and discovery phase of the ONU activation for ONU 140-*x* is completed. If ONU 140-*x* does not receive an ONU-ID assignment (block 475—no), ONU 140-*x* may continue to receive messages 510-540 and determine if a ONU-ID assignment is received. After completion of the ONU acquisition/discovery phase (e.g., an ONU-ID assignment is received), a ranging phase of the ONU activation process may commence For example, as described above, ONU 140-*x* may receive a directed ranging grant 570 from OLT 110. In response, ONU 140-*x* may respond to the ranging grant by transmitting an upstream burst OAM message 580 (e.g., a Serial Number ONU message, a registration message or some other message) (block 480). ONU 140-*x* may also receive a unicast OAM message 590 which may be a Ranging Time message. The reception of OAM message 590 completes ONU 140-*x* activation. At this point, ONU 140-*x* is considered to be activated. In some implementations, ONU 140-*x* may transmit an acknowledgement of receipt of OAM message.

Implementations described herein perform ONU activation using a plurality of dynamically assigned contention-based Alloc-IDs that include category information associated with ONUs 140 present in environment 100. This may allow for efficient use of Alloc-IDs as a system number resource, as well as provide for increased flexibility in accommodating various categories of ONUs 140. Still further, implementations described here may increase upstream throughput by minimizing the burst-mode overhead associated with ONU activation.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, while series of acts have been escribed with respect to FIGS. 4A and 4B and signal flows with respect to FIG. 5, the order of the acts and/or signal flows may be different in other implementations. Moreover, non-dependent acts may be implemented in parallel.

To the extent the aforementioned implementations collect, store or employ personal information of individuals, groups or other entities, it should be understood that such information shall be used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   determining a plurality of categories associated with a plurality of optical network units (ONUs) in a system;
   assigning an allocation identifier to each of the respective plurality of categories;
   transmitting, via first messages associated with an allocation identifier assignment phase for the ONUs, the assigned allocation identifiers to the plurality of ONUs, wherein each of the first messages includes an allocation identifier and category information identifying one of the plurality of categories, wherein the allocation identifier and the category information are separate pieces of information; and
   transmitting an allocation message associated with an ONU discovery phase for the ONUs to the plurality of ONUs, wherein the allocation message includes a first one of the allocation identifiers.

2. The method of claim 1, wherein the first messages comprise operation, administration and maintenance (OAM) messages, and wherein transmitting, via the first messages, the assigned allocation identifiers comprises:
   broadcasting a plurality of OAM messages, wherein each of the OAM messages includes the allocation identifier and category information.

3. The method of claim 2, further comprising:
   determining, by a first one of the plurality of ONUs, which of the plurality of OAM messages includes an allocation identifier associated with a category of the first ONU.

4. The method of claim 1, further comprising:
   receiving, from a first one of the plurality of ONUs and in response to the allocation message including the first allocation identifier, a message identifying the first ONU.

5. The method of claim 4, further comprising:
   determining, by the first ONU, that the first ONU is associated with a first category corresponding to the first allocation identifier; and
   transmitting, by the first ONU, the message identifying the first ONU.

6. The method of claim 1, wherein the plurality of categories comprises a category associated with a state of one of the plurality of ONUs and a category associated with a transmission rate associated with one of the plurality of ONUs.

7. The method of claim 1, wherein the assigning an allocation identifier comprises assigning a unique allocation identifier to each of the plurality of categories,
   wherein the plurality of categories comprise:
   a first category identifying ONUs that have not previously connected to an optical line terminal (OLT), and
   a second category identifying ONUs that have previously connected to the OLT.

8. The method of claim 1, further comprising:
   transmitting distinct allocation messages for activating ONUs in each of the plurality of categories.

9. The method of claim 1, wherein the transmitting the assigned allocation identifiers comprises:
   broadcasting a plurality of operation, administration and maintenance (OAM) messages, each of the plurality of OAM messages including one of the assigned allocation identifiers, and
   wherein at least one of the OAM messages includes information identifying requirements associated with a preamble for a burst message to be transmitted from at least one of the plurality of ONUs.

10. A device, comprising:
    a communication interface; and
    at least one processor configured to:
    determine a plurality of categories associated with a plurality of optical network units (ONUs) in a system,
    assign an allocation identifier to each of the respective plurality of categories,
    transmit, via the communication interface and via first messages associated with an allocation identifier assignment phase for the ONUs, the assigned allocation identifiers to the plurality of ONUs, wherein each of the first messages includes an allocation identifier and category information identifying one of the plurality of categories, wherein the allocation identifier and the category information are separate pieces of information, and transmit, via the communication interface, an allocation message associated with an ONU discovery phase for the ONUs to the plurality of ONUs, wherein the allocation message includes a first one of the allocation identifiers.

11. The device of claim 10, wherein the first messages comprise operation, administration and maintenance (OAM) messages, and wherein when transmitting, via the first messages, the allocation identifiers, the at least one processor is configured to:

broadcast, via the communication interface, a plurality of OAM messages, wherein each of the OAM messages includes the allocation identifier and category information.

12. The device of claim 10, wherein the at least one processor is further configured to:

receive, from a first one of the plurality of ONUs and in response to the allocation message including the first allocation identifier, a message identifying the first ONU.

13. The device of claim 10, wherein the plurality of categories comprises a category associated with a state of one of the plurality of ONUs and a category associated with a transmission rate associated with one of the plurality of ONUs.

14. The device of claim 10, wherein when assigning an allocation identifier, the at least one processor is configured to assigning a unique allocation identifier to each of the plurality of categories.

15. The device of claim 10, wherein when transmitting, via the first messages, the assigned allocation identifiers, the at least on processor is further configured to:

broadcast, via the communication interface, a plurality of operation, administration and maintenance (OAM) messages, wherein at least one of the OAM messages includes information identifying requirements associated with a preamble for a burst message to be transmitted from at least one of the plurality of ONUs.

16. The device of claim 10, wherein the device comprises an optical line terminal channel termination device, and wherein the plurality of categories comprise:

a first category identifying ONUs that have not previously connected to the optical line terminal channel termination device, and a second category identifying ONUs that have previously connected to the optical line terminal channel termination device.

17. A non-transitory computer-readable medium having stored thereon sequences of instructions which, when executed by at least one processor, cause the at least one processor to:

identify a plurality of categories of optical network units (ONUs) in a system;

assign an allocation identifier to each of the respective plurality of categories;

transmit, via first messages associated with an allocation identifier assignment phase, the assigned allocation identifiers to a plurality of ONUs in the system, wherein each of the first messages includes an allocation identifier and category information identifying one of the plurality of categories, wherein the allocation identifier and the category information are separate pieces of information; and transmit allocation messages associated with an ONU discovery phase to the plurality of ONUs, wherein each of the allocation messages includes one of the plurality of allocation identifiers.

18. The non-transitory computer-readable medium of claim 17, wherein the first messages comprise operation, administration and maintenance (OAM) messages, and wherein when transmitting, via the first messages, the allocation identifiers, the instructions cause the at least one processor to:

broadcast a plurality OAM messages, wherein each of the OAM messages includes the allocation identifier and category information.

19. The non-transitory computer-readable medium of claim 17, wherein the instructions further cause the at least one processor to:

receive, from a first one of the plurality of ONUs and in response to one of the allocation messages, a message identifying the first ONU.

20. The non-transitory computer-readable medium of claim 17, wherein when identifying the plurality of categories, the instructions cause the at least one processor to:

identify categories associated with at least one of a state of one of the plurality of ONUs, wherein the state corresponds to a previously connected state with respect to an optical line terminal or a not previously connected state with respect to the optical line terminal, and a transmission rate associated with one of the plurality of ONUs.

\* \* \* \* \*